(12) United States Patent
Endres et al.

(10) Patent No.: US 7,682,408 B2
(45) Date of Patent: Mar. 23, 2010

(54) DISPERSE AZO DYESTUFFS

(75) Inventors: Andreas Endres, Leverkusen (DE);
Rainer Hamprecht, Odenthal (DE);
Hartwig Jordan, Bergisch-Gladbach (DE); Anthony Lawrence, Köln (DE);
Nigel Hall, Bury Lancashire (GB)

(73) Assignee: Dy Star Textilfarben GmbH & Co. (DE)

( * ) Notice: Subject to any disclaimer, the term of this patent is extended or adjusted under 35 U.S.C. 154(b) by 0 days.

(21) Appl. No.: 12/281,003

(22) PCT Filed: Mar. 2, 2007

(86) PCT No.: PCT/EP2007/052027

§ 371 (c)(1),
(2), (4) Date: Aug. 28, 2008

(87) PCT Pub. No.: WO2007/101828

PCT Pub. Date: Sep. 13, 2007

(65) Prior Publication Data

US 2009/0064426 A1    Mar. 12, 2009

(30) Foreign Application Priority Data

Mar. 8, 2006    (GB) .................... 0604681.7

(51) Int. Cl.
*C09B 29/08*    (2006.01)
*C08B 11/155*    (2006.01)

(52) U.S. Cl. .............. 8/662; 8/636; 564/307; 564/451

(58) Field of Classification Search ........ 8/636, 8/662; 564/307, 451
See application file for complete search history.

(56) References Cited

U.S. PATENT DOCUMENTS

| 3,288,779 A | 11/1966 | Randall |
| 3,544,550 A | 12/1970 | Anderton |
| 3,553,190 A | 1/1971 | Anderton |
| 3,557,080 A | 1/1971 | Dehnert et al. |
| 3,776,898 A | 12/1973 | Stanley at al. |
| 5,569,751 A | 10/1996 | Buhler |
| 6,372,893 B1 * | 4/2002 | Nusser ............... 534/634 |

FOREIGN PATENT DOCUMENTS

| DE | 2130992 | 12/1971 |
| EP | 0685531 A1 | 12/1995 |
| FR | 1531147 | 6/1968 |
| GB | 1321902 | 7/1973 |
| GB | 1457532 | 12/1976 |
| GB | 1536429 | 12/1978 |
| GB | 1536429 A * | 12/1978 |
| GB | 2104088 | 3/1983 |
| JP | 55161857 | 12/1980 |
| WO | WO-95/20014 A1 | 7/1995 |
| WO | WO-2005/040283 A2 | 5/2005 |

OTHER PUBLICATIONS

EIC/STN Search for Dye Structure of U.S. Appl. No. 12/281,003; completed by STIC on Apr. 16, 2009.*

* cited by examiner

*Primary Examiner*—Harold Y Pyon
*Assistant Examiner*—Katie Hammer
(74) *Attorney, Agent, or Firm*—Connolly Bove Lodge & Hutz, LLP

(57) ABSTRACT

The present invention relates to a dyestuff of the formula (I)

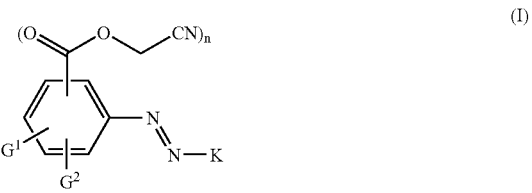

wherein
each of $G^1$ and $G^2$, independently is hydrogen, $(C_1-C_4)$-alkyl, trifluoromethyl, halogen, nitro, cyano or $-SO_2-T$, wherein T is halogen, $(C_1-C_4)$-alkyl, $(C_1-C_4)$-alkoxy, aryl or aryloxy;
K is a coupling component; and
n is 1 or 2. The invention also relates to a process for its preparation and their use and for ink jet printing containing the ink.

12 Claims, No Drawings

DISPERSE AZO DYESTUFFS

CROSS-REFERENCE TO RELATED APPLICATIONS

This application is a national stage application (under 35 U.S.C. §371) of PCT/EP2007/052027, filed Mar. 2, 2007, which claims benefit of United Kingdom application 0604681.7, filed Mar. 8, 2006.

BACKGROUND OF THE INVENTION

1. Field of Invention

The present invention relates to the field of disperse dyes.

2. Background of the Invention

Disperse dyestuffs containing cyanomethyl ester groups are known from literature and are described for example in GB 909,843, DE-A 2130992, GB 1,457,532, GB 1,536,429, FR-A 1,531,147, U.S. Pat. No. 3,776,898, JP 55161857, GB 2,104,088, EP 0 685 531 A1, WO 95/20014 and WO2005/040283. All dyestuffs disclosed in these documents show the cyanomethylester groups in the coupling component.

SUMMARY OF THE INVENTION

The inventors of the present invention have surprisingly found that dyeings on polyester with excellent wet fastness properties can be obtained if dyestuffs containing the cyanomethylester groups in the diazo component as defined below are used.

The present invention claims dyestuffs of the formula (I)

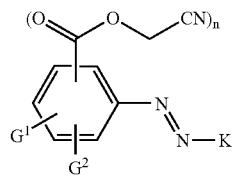

(I)

wherein each of $G^1$ and $G^2$, independently is hydrogen, $(C_1-C_4)$-alkyl, trifluoromethyl, halogen, nitro, cyano or —$SO_2$-T, wherein T is halogen, $(C_1-C_4)$-alkyl, $(C_1-C_4)$-alkoxy, aryl or aryloxy;

K is a coupling component; and n is 1 or 2.

A DETAILED DESCRIPTION OF THE INVENTION

The present invention relates to the field of disperse dyes. The invention also provides for a process of producing and using the dye of the formula (I).

Coupling components K can be all coupling components which are used for the preparation of disperse dyes. Such coupling components are described in literature and known to a person of ordinary skill in the art.

Preferred coupling components K are of the formula (IIa)

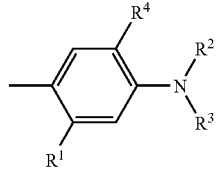

(IIa)

wherein $R^1$ is hydrogen, hydroxyl, $(C_1-C_4)$-alkyl, $(C_1-C_4)$-alkylsulfonamino or $(C_1-C_4)$-acylamino;

each of $R^2$ and $R^3$, independently is hydrogen, $(C_1-C_6)$-alkyl, $(C_1-C_6)$-alkyl which is substituted by hydroxyl, cyano, nitro, —$COOR^5$, —$COONR^5R^6$, —$SO_2NR^5R^6$, —$SO_3R^5$, $(C_1-C_4)$-acyloxy, $(C_1-C_4)$-acylamino, an imide group or aryl, $(C_1-C_6)$-alkenyl, $(C_1-C_6)$-alkenyl which is substituted by hydroxyl, cyano, nitro, —$COOR^5$, —$COONR^5R^6$, —$SO_2NR^5R^6$, —$SO_3R^5$, $(C_1-C_4)$-acyloxy, $(C_1-C_4)$-acylamino, an imide group or aryl, $(C_2-C_6)$-alkyl which is interrupted by 1, 2 or 3 heteroatoms selected from the group consisting of —O—, —S— and —$NR^7$, or $(C_2-C_6)$-alkyl which is interrupted by 1, 2 or 3 heteroatoms selected from the group consisting of —O—, —S— and —$NR^7$ and which is substituted by hydroxyl, cyano, nitro, —$COOR^5$, —$COONR^5R^6$, —$SO_2NR^5R^6$, —$SO_3R^5$ $(C_1-C_4)$-acyloxy, $(C_1-C_4)$-acylamino an imide group or aryl;

$R^4$ is hydrogen, $(C_1-C_4)$-alkyl, $(C_1-C_4)$-alkoxy or halogen; or $R^2$ and $R^4$ together are $(C_2-C_5)$-alkylen, $(C_2-C_5)$-alkylen, which is substituted by $(C_1-C_4)$-alkyl, hydroxyl, cyano, nitro, —$COOR^5$, —$SO_2NR^5R^6$, —$SO_3R^5$, $(C_1-C_4)$-acyloxy, $(C_1-C_4)$-acylamino or aryl, $(C_2-C_5)$-alkenylen or $(C_2-C_5)$-alkenylen, which is substituted by $(C_1-C_4)$-alkyl, hydroxyl, cyano, nitro, —$COOR^5$, —$SO_2NR^5R^6$, —$SO_3R^5$, $(C_1-C_4)$-acyloxy, $(C_1-C_4)$-acylamino or aryl;

$R^5$ is hydrogen or $(C_1-C_4)$-alkyl; and $R^6$ is hydrogen or $(C_1-C_4)$-alkyl;

Especially preferred coupling components K correspond to the formula (IIa), wherein $R^1$ is hydrogen, methyl, ethyl, methylsulfonylamino, acetylamino and propionylamino; each of $R^2$ and $R^3$, independently is hydrogen, methyl, ethyl, propyl or butyl or methyl, ethyl, propyl or butyl which is substituted by hydroxy, cyano, —$COOCH_3$, —$COOC_2H_5$, —COOphenyl, —OCOCH₃, —OCOC₂H₅, —OCOphenyl, methoxy, ethoxy or phenyl, or is allyl; and R⁴ is hydrogen, methyl, ethyl, methoxy, ethoxy or chlorine.

Further especially preferred coupling components K correspond to the formula (IIaa)

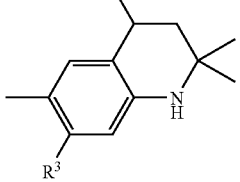

(IIaa)

wherein R³ is defined as given above.

Further preferred coupling components K are of the formula (IIb)

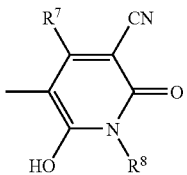

(IIb)

wherein

R⁷ is hydrogen, (C₁-C₄)-alkyl or trifluormethyl; and

R⁸ is hydrogen, (C₁-C₆)-alkyl, (C₁-C₆)-alkyl which is substituted by hydroxyl, cyano, nitro, —COOR⁵, —COONR⁵R⁶, —SO₂NR⁵R⁶, —SO₃R⁵, (C₁-C₄)-acyloxy, (C₁-C₄)-acylamino, an imido group or aryl, (C₁-C₆)-alkenyl, (C₁-C₆)-alkenyl which is substituted by hydroxyl, cyano, nitro, —COOR⁵, —COONR⁵R⁶, —SO₂NR⁵R⁶, —SO₃R⁵, (C₁-C₄)-acyloxy, (C₁-C₄)-acylamino, an imido group or aryl, (C₂-C₆)-alkyl which is interrupted by 1, 2 or 3 heteroatoms selected from the group consisting of —O—, —S— and —NR⁷, or (C₂-C₆)-alkyl which is interrupted by 1, 2 or 3 heteroatoms selected from the group consisting of —O—, —S— and —NR⁷ and which is substituted by hydroxyl, cyano, nitro, —COOR⁵, —COONR⁵R⁶, —SO₂NR⁵R⁶, —SO₃R⁵, (C₁-C₄)-acyloxy, (C₁-C₄)-acylamino, an imido group or aryl.

Further especially preferred coupling components K correspond to the formula (IIb), wherein R⁷ is methyl; and R⁸ is methyl or ethyl.

Further preferred coupling components K are of the formula (IIc)

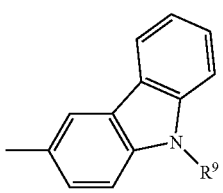

(IIc)

wherein

R⁹ is hydrogen, (C₁-C₆)-alkyl, (C₁-C₆)-alkyl which is substituted by hydroxyl, cyano, nitro, —COOR⁵, —COONR⁵R⁶, —SO₂NR⁵R⁶, —SO₃R⁵, (C₁-C₄)-acyloxy, (C₁-C₄)-acylamino, an imido group or aryl, (C₁-C₆)-alkenyl, (C₁-C₆)-alkenyl which is substituted by hydroxyl, cyano, nitro, —COOR⁵, COONR⁵R⁶, —SO₂NR⁵R⁶, —SO₃R⁵, (C₁-C₄)-acyloxy, (C₁-C₄)-acylamino, an imido group or aryl, (C₂-C₆)-alkyl which is interrupted by 1, 2 or 3 heteroatoms selected from the group consisting of —O—, —S— and —NR⁷, or (C₂-C₆)-alkyl which is interrupted by 1, 2 or 3 heteroatoms selected from the group consisting of —O—, —S— and —NR⁷ and which is substituted by hydroxyl, cyano, nitro, —COOR⁵, COONR⁵R⁶, —SO₂NR⁵R⁶, —SO₃R⁵, (C₁-C₄)-acyloxy, (C₁-C₄)-acylamino, an imido group or aryl.

Further especially preferred coupling components K correspond to the formula (IIc), wherein R⁹ is methyl, ethyl, hydroxymethyl or hydroxyethyl.

Still further preferred coupling components K are of the formula (IId)

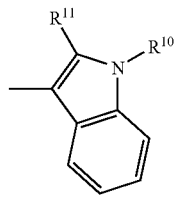

(IId)

wherein

R¹⁰ is hydrogen, (C₁-C₆)-alkyl, (C₁-C₆)-alkyl which is substituted by hydroxyl, cyano, nitro, —COOR⁵, —COONR⁵R⁶, —SO₂NR⁵R⁶, —SO₃R⁵, (C₁-C₄)-acyloxy, (C₁-C₄)-acylamino, an imido group or aryl, (C₁-C₆)-alkenyl, (C₁-C₆)-alkenyl which is substituted by hydroxyl, cyano, nitro, —COOR⁵, —COONR⁵R⁶, —SO₂NR⁵R⁶, —SO₃R⁵, (C₁-C₄)-acyloxy, (C₁-C₄)-acylamino, an imido group or aryl, (C₂-C₆)-alkyl which is interrupted by 1, 2 or 3 heteroatoms selected from the group consisting of —O—, —S— and —NR⁷, or (C₂-C₆)-alkyl which is interrupted by 1, 2 or 3 heteroatoms selected from the group consisting of —O—, —S— and —NR⁷ and which is substituted by hydroxyl, cyano, nitro, —COOR⁵, —COONR⁵R⁶, —SO₂NR⁵R⁶, —SO₃R⁵, (C₁-C₄)-acyloxy, (C₁-C₄)-acylamino, an imido group or aryl; and R¹¹ is hydrogen, (C₁-C₆)-alkyl, (C₁-C₆)-alkyl which is substituted by hydroxyl, cyano, nitro, —COOR⁵, —SO₂NR⁵R⁶, —SO₃R⁵, (C₁-C₄)-acyloxy, (C₁-C₄)-acylamino or aryl or is aryl.

Further especially preferred coupling components K correspond to the formula (IId), wherein R¹⁰ is methyl or ethyl; and R¹¹ is methyl, ethyl or phenyl.

Alkyl groups may be straight-chain or branched and are preferably methyl, ethyl, n-propyl, i-propyl or n-butyl. The same logic applies to alkoxy groups which are preferably methoxy, ethoxy or propoxy.

Alkenyl groups are preferably vinyl and allyl, whereas alkylen groups are preferably methylen, ethylen and propylen.

Acyl groups are preferably acetyl groups and consequently acylamino groups are preferably acetylamino and acyloxy groups are preferably acetyloxy.

Preferred imido groups are maleimide, succinimide and in particular phthalimide. Examples of $(C_2\text{-}C_6)$-alkyl groups which is interrupted by 1, 2 or 3 heteroatoms selected from the group consisting of —O—, —S— and —NR$^7$—, are —CH$_2$—O—CH$_2$—, —(CH$_2$)$_2$—O—(CH$_2$)$_2$—, —CH$_2$—S—CH$_2$—, —(CH$_2$)$_2$—S—(CH$_2$)$_2$—, —CH$_2$—NR$^{7'}$—CH$_2$— or —(CH$_2$)$_2$—NR$^{7'}$—(CH$_2$)$_2$—, wherein R$^{7'}$ is hydrogen or methyl.

Halogen is preferably fluorine, chlorine or bromine.

Aryl is preferably phenyl or naphthly, whereas aryloxy is preferably phenoxy or naphthoxy.

Aryl and aryloxy groups may be substituted by 1, 2 or 3 substituents. Examples of such substituents are $(C_1\text{-}C_6)$-alkyl, $(C_1\text{-}C_6)$-alkoxy, halogen, cyano and nitro. Preferred dyestuffs according to the present invention are dyestuffs of the formula (Ia)

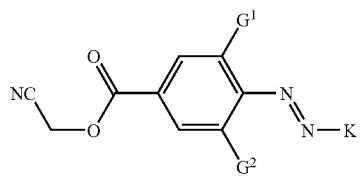
(Ia)

wherein G$^1$, G$^2$ and K are defined as given above.

In especially preferred dyestuffs of the formula (Ia) each of G$^1$ and G$^2$, independently is hydrogen, chlorine, bromine, nitro or cyano and K is a coupling component of the formula (IIa), (IIb), (IIc) or (IId), favourably an especially preferred coupling component as defined above.

Further preferred dyestuffs according to the present invention are dyestuffs of the formula (Ib)

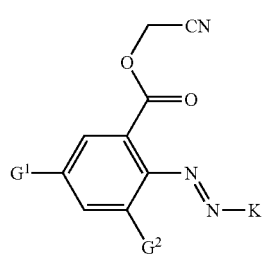
(Ib)

wherein G$^1$, G$^2$ and K are defined as given above.

In especially preferred dyestuffs of the formula (Ib) G$^2$ is hydrogen, chlorine, bromine, nitro or cyano, G$^1$ is hydrogen or nitro, if G$^2$ is hydrogen, is nitro if G$^2$ is nitro or cyano, is chlorine or nitro if G$^2$ is chlorine and is bromine or nitro if G$^2$ is bromine, and K is a coupling component of the formula (IIa), (IIb), (IIc) or (IId), favourably an especially preferred coupling component as defined above.

Still further preferred dyestuffs according to the present invention are dyestuffs of the formula (Ic)

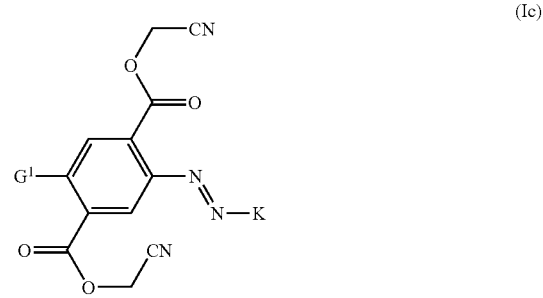
(Ic)

wherein G$^1$ and K are defined as given above.

In especially preferred dyestuffs of the formula (Ic) G$^1$ is nitro and K is a coupling component of the formula (IIa), (IIb), (IIc) or (IId), favourably an especially preferred coupling component as defined above.

Especially preferred dyestuffs are the dyestuffs of the formula (Iaa)

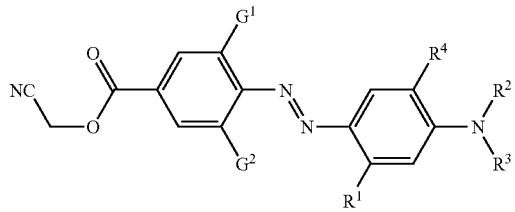
(Iaa)

wherein each of G$^1$ and G$^2$, independently is hydrogen, chlorine, bromine, nitro or cyano;

R$^1$ is hydrogen, methyl, ethyl, methylsulfonylamino, acetylamino and propionylamino;

each of R$^2$ and R$^3$, independently is hydrogen, methyl, ethyl, propyl or butyl or methyl, ethyl, propyl or butyl which is substituted by hydroxy, cyano, —COOCH$_3$, —COOC$_2$H$_5$, —COOphenyl, —OCOCH$_3$, —OCOC$_2$H$_5$, —OCOphenyl, methoxy, ethoxy or phenyl, or is allyl; and R$^4$ is hydrogen, methyl, ethyl, methoxy, ethoxy or chlorine.

Further especially preferred dyestuffs are the dyestuffs of the formula (Iba)

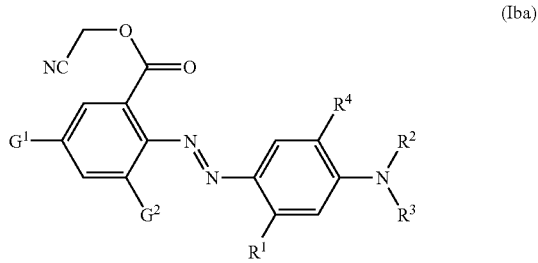
(Iba)

wherein

G² is hydrogen, chlorine, bromine, nitro or cyano;

G¹ is hydrogen or nitro, if G² is hydrogen, is nitro if G² is nitro or cyano, is chlorine or nitro if G² is chlorine and is bromine or nitro if G² is bromine;

R¹ is hydrogen, methyl, ethyl, methylsulfonylamino, acetylamino and propionylamino;

each of R² and R³, independently is hydrogen, methyl, ethyl or propyl or methyl, ethyl or propyl which is substituted by hydroxy, cyano, —COOCH₃, —COOC₂H₅, —COOphenyl, —OCOCH₃, —OCOC₂H₅, —OCOphenyl, methoxy, ethoxy or phenyl, or is allyl; and R⁴ is hydrogen, methyl, ethyl, methoxy, ethoxy or chlorine.

The compounds of the formula (I) may be obtained by usual methods for the preparation of azo compounds such as by diazotisation of an amine of the formula (III)

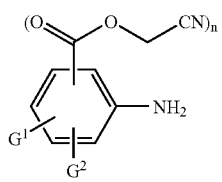

(III)

wherein G¹, G² and n are defined as given above, and coupling onto a compound of the formula (IV)

H—K    (IV)

wherein K is defined as given above.

Typically the amine of the formula (III) may be diazotised in an acidic medium, such as acetic, propionic or hydrochloric acid using a nitrosating agent such as nitrosylsulphuric acid, sodium nitrite or methylnitrite at a temperature from −10° C. to 10° C. Coupling onto the compound of the formula (IV) may be achieved by adding the diazotised amine to the compound of the formula (IV) under conditions described in literature and known to the skilled persons.

After coupling the compound of the formula (I) may be recovered from the reaction mixture by any convenient means such as filtration.

Cyanomethyl ester containing amines of the formula (III) can be prepared from commercially available or literature described starting materials by a number of ways which are known to a person of ordinary skill in the art and which are described in literature. Using methods described for example in Tetrahedron Lett. 2004, pp 969-972; Helv. Chim. Acta 1964, pp 2444-2448 and Synthesis 1995, pp 1483-1484, the compounds of formulae (IIIa) to (IIIg) can be produced.

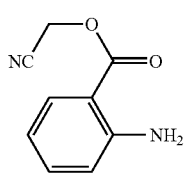

(IIIa)

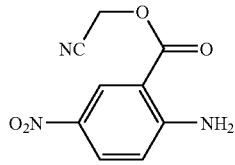

(IIIb)

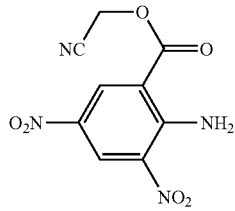

(IIIc)

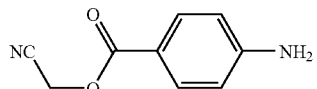

(IIId)

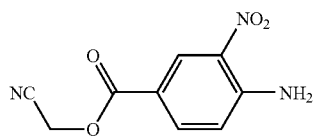

(IIIe)

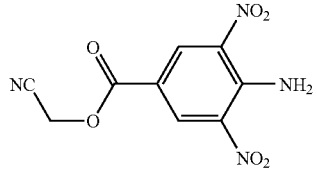

(IIIf)

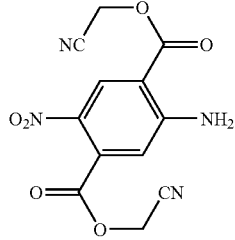

(IIIg)

In some circumstances, a mixture of reaction products is produced, resulting from reaction on oxygen and/or nitrogen. These mixtures can be used directly, since only the required selective oxygen reacted products undergo diazotization and coupling to form the final dyestuff.

The compounds of the formulae (IIIa), (IIIb), (IIId), (IIIe) or (IIIg) can be mono- or di-brominated by treating them with 1 (compounds (IIIb), (IIIe) and (IIIg)) or 2 (compounds (IIIa) and (IIId)) mole equivalents of bromine in acetic acid, in the presence of sodium acetate.

The compounds of the formulae (IIIa), (IIIb), (IIId), (IIIe) or (IIIg) can also be mono- or di-chlorinated by treating them with 1 (compounds (IIIb), (IIIe) and (IIIg)) or 2 (compounds (IIIa) and (IIId)) mole equivalents of an oxidizing agent, such as hydrogen peroxide, in a mixture of hydrochloric and acetic acid.

As such, the compounds of formulae (IIIh) to (IIIq) can be prepared.

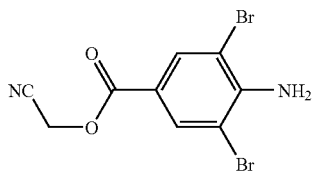
(IIIh)

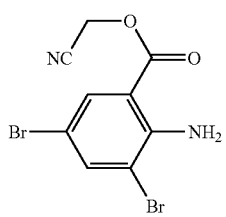
(IIIj)

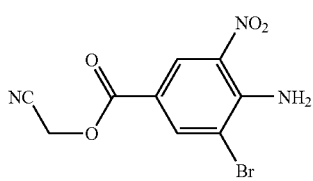
(IIIk)

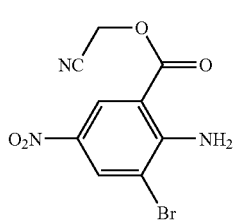
(IIIm)

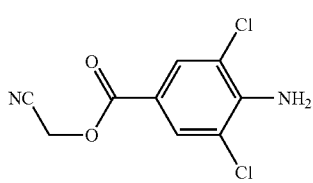
(IIIn)

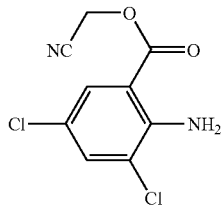
(IIIo)

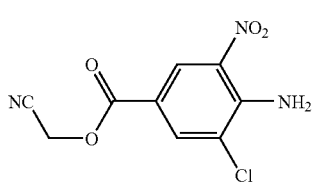
(IIIp)

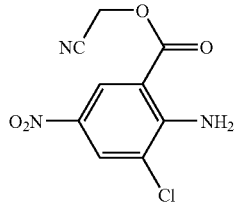
(IIIq)

The compounds of the formulae (IV) are known or are easily prepared under standard conditions known to those skilled in the art.

The compounds of the formula (I) are useful for dyeing and printing of synthetic textile material particularly polyester textile materials and fibre blends thereof with for example cellulosic materials like cotton, to which they impart colours which have excellent wet fastness properties.

Dyeing of the fibre goods mentioned with the dyestuffs of the formula (I) can be carried out in a manner known per se, preferably from aqueous dispersions, if appropriate in the presence of carriers, at between 80 and 110° C., by the exhaust process or by the HT process in a dyeing autoclave at 110 to 140° C., and by the so-called thermofixing process, in which the goods are padded with the dye liquor and then fixed at about 180 to 230° C.

The fibre goods mentioned can as well be printed in a manner known per se by a procedure in which the dyestuffs of the formula (I) are incorporated into a printing paste and the goods printed with the paste are treated, if appropriate in the presence of a carrier, with HT steam, pressurized steam or dry heat at temperatures between 180 and 230° C. to fix the dyestuff.

The dyestuffs of the formula (I) should be present in the finest possible dispersion in the dye liquors and printing pastes employed in the above applications.

The fine dispersion of the dyestuffs is effected in a manner known per se by a procedure in which the dyestuff obtained during preparation is suspended in a liquid medium, preferably in water, together with dispersing agents and the mixture is exposed to the action of shearing forces, the particles originally present being comminuted mechanically to the extent that an optimum specific surface area is achieved and sedimentation of the dyestuff is as low as possible. The particle size of the dyestuffs is in general between 0.5 and 5 μm, preferably about 1 μm.

The dispersing agents used can be nonionic or anionic. Nonionic dispersing agents are, for example, reaction products of alkylene oxides, such as, for example, ethylene oxide or propylene oxide, with alkylatable compounds, such as for example fatty alcohols, fatty amines, fatty acids, phenols, alkylphenols and carboxylic acid amines. Anionic dispersing agents are, for example, lignin-sulphonates, alkyl- or alkylarylsulphonates or alkylaryl polyglycol ethersulphates.

For most methods of use, the dyestuff formulations thus obtained should be pourable. The dyestuff and dispersing agent content is therefore limited in these cases. In general, the dispersions are brought to a dyestuff content of up to 50 percent by weight and a dispersing agent content of up to 25 percent by weight. For economic reasons, the dyestuff contents usually do not fall below 15 percent by weight.

The dispersions can also comprise other auxiliaries, for example those which act as oxidizing agents or fungicidal agents. Such agents are well known in the art.

The dyestuff dispersion thus obtained can be used very advantageously for the preparation of printing pastes and dye liquors.

For certain fields of use, powder formulations are preferred. These powders comprise the dyestuff, dispersing agents and other auxiliaries, such as, for example, wetting agents, oxidizing agents, preservatives and dust removal agents.

A preferred preparation process for pulverulent dyestuff formulations comprises removing the liquid from the liquid dyestuff dispersions described above, for example by vacuum drying, freeze drying, by drying on roller dryers, but preferably by spray drying.

In addition, the inventive dyestuffs of formula (I) can advantageously be used in inks for digital ink jet printing.

Consequently, the present invention also refers to an ink for injet printing which contains at least one dyestuff of the formula (I).

Inks for use in digital ink jet printing usually are aqueous inks and further comprise from 0.1% to 20% of a dispersant. Useful dispersants include for example sulfonated or sulfomethylated lignins, formaldehyde condensates of aromatic sulfonic acids, formaldehyde condensates of substituted or unsubstituted phenol derivatives, polyacrylates and copolymers thereof, styrene oxide polyethers, modified polyurethanes, reaction products of alkylene oxides with alkylatable compounds such as for example fatty alcohols, fatty amines, fatty acids, carboxamides, resin acids and also substituted or unsubstituted phenols.

Inks to be used in the continuous flow process can be adjusted to a conductivity in the range from 0.5 to 25 mS/cm by addition of electrolyte.

Useful electrolytes include for example lithium nitrate and potassium nitrate. In addition the inventive inks may further comprise typical ink jet organic solvents in a total amount of 1-60% and preferably of 5-40% by weight.

Example 1

2-{4-[(2-Cyano-ethyl)-ethyl-amino]-phenylazo}-5-nitro-benzoic acid cyanomethyl ester

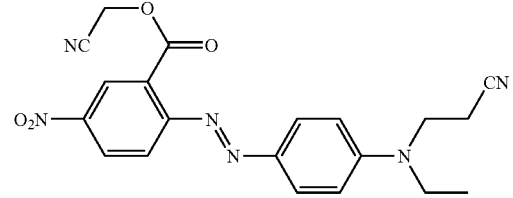

(Ibb)

3.3 parts of compound (IIIb), 20 parts of propionic acid and 40 parts of acetic acid were charged and cooled to 5° C. 5.1 parts of 40% (w/w) nitrosyl sulfuric acid were added, whilst the temperature was held below 10° C. The diazotization mixture was stirred for a further 2 hrs at 5-10° C. To a separate vessel were charged 2.7 parts of 3-(ethyl-phenyl-amino)-propionitrile, 100 parts of methanol, 1 part sulfamic acid and 100 parts of ice. With stirring, the diazotization mixture was slowly added followed by a further 300 parts of ice. The reaction mixture was stirred over night and the product was isolated by filtration, washed with water and dried to yield 4.9 parts of 2-{4-[(2-cyano-ethyl)-ethyl-amino]-phenylazo}-5-nitro-benzoic acid cyanomethyl ester. λmax=496 nm (DMF).

When applied to polyester materials from an aqueous dispersion, red shades with excellent wet fastness properties were seen.

According to the procedure outlined in Example 1, inventive dyes of formula (Iba) [Table 1] were prepared (λmax was determined in DMF and is given in nm)

TABLE 1

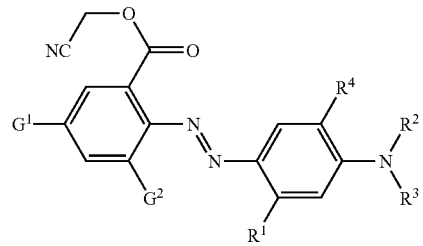

(Iba)

| | $G^2$ | $G^1$ | $R^1$ | $R^2$ | $R^3$ | $R^4$ | λmax |
|---|---|---|---|---|---|---|---|
| 2 | H | $NO_2$ | H | $CH_2CH_2CO_2CH_3$ | $CH_2CH_2CO_2CH_3$ | H | 480 |
| 3 | H | $NO_2$ | H | $CH_2CH_3$ | $CH_2CH_2CO_2CH_3$ | H | 496 |
| 4 | H | $NO_2$ | H | $CH_2CO_2CH_3$ | $CH_2CH_2CN$ | H | 472 |
| 5 | H | $NO_2$ | H | $CH_2CO_2CH_3$ | $CH_2CO_2CH_3$ | H | 468 |
| 6 | Cl | $NO_2$ | H | $CH_2CH_3$ | $CH_2CH_2CN$ | H | 494 |
| 7 | Cl | $NO_2$ | H | $CH_2CH_2CO_2CH_3$ | $CH_2CH_2CO_2CH_3$ | H | 486 |
| 8 | Cl | $NO_2$ | H | $CH_2CO_2CH_3$ | $CH_2CH_2CN$ | H | 488 |
| 9 | Br | $NO_2$ | H | $CH_2CO_2CH_3$ | $CH_2CH_2CN$ | H | 488 |
| 10 | Cl | $NO_2$ | H | $CH_2CO_2CH_3$ | $CH_2CO_2CH_3$ | H | 484 |
| 11 | Br | $NO_2$ | H | $CH_2CO_2CH_3$ | $CH_2CO_2CH_3$ | H | 480 |
| 12 | H | H | $CH_3$ | $CH_2CH_3$ | $CH_2CH_2CO_2CH_3$ | H | 442 |
| 13 | H | H | $CH_3$ | $CH_2CH_3$ | $CH_2CH_2CN$ | H | 432 |
| 14 | H | H | $CH_3$ | $CH_2CH_3$ | $CH_2CH_2OC(O)CH_3$ | H | 440 |
| 15 | H | H | $CH_3$ | $CH_2CH_2CO_2CH_3$ | $CH_2CH_2CO_2CH_3$ | H | 430 |
| 16 | H | $NO_2$ | $CH_3$ | $CH_2CH_3$ | $CH_2CH_2CN$ | H | 504 |
| 17 | H | $NO_2$ | $CH_3$ | $CH_2CH_3$ | $CH_2CH_2OC(O)CH_3$ | H | 512 |
| 18 | H | $NO_2$ | $CH_3$ | $CH_2CH_2CO_2CH_3$ | $CH_2CH_2CO_2CH_3$ | H | 490 |

TABLE 1-continued (Iba)

| | G² | G¹ | R¹ | R² | R³ | R⁴ | λmax |
|---|---|---|---|---|---|---|---|
| 19 | Cl | Cl | CH₃ | CH₂CH₃ | CH₂CH₂CN | H | 468 |
| 20 | Br | Br | CH₃ | CH₂CH₃ | CH₂CH₂CN | H | 466 |
| 21 | Cl | Cl | CH₃ | CH₂CH₂CO₂CH₃ | CH₂CH₂CO₂CH₃ | H | 466 |
| 22 | Br | Br | CH₃ | CH₂CH₂CO₂CH₃ | CH₂CH₂CO₂CH₃ | H | 464 |
| 23 | Cl | Cl | CH₃ | CH₂CH₃ | CH₂CH₂CO₂CH₃ | H | 480 |
| 24 | Br | Br | CH₃ | CH₂CH₃ | CH₂CH₂CO₂CH₃ | H | 480 |
| 25 | NO₂ | NO₂ | CH₃ | CH₂CH₃ | CH₂CH₃ | H | 574* |
| 26 | H | NO₂ | HNCOCH₃ | CH₂CH₃ | CH₂CH₃ | H | 560* |
| 27 | H | NO₂ | HNCOCH₃ | CH₂CH₂OCH₃ | CH₂CH₂OCH₃ | H | 512 |
| 28 | Cl | Cl | HNCOCH₃ | CH₂CH₃ | CH₂CH₃ | H | 500 |
| 29 | Br | Br | HNCOCH₃ | CH₂CH₃ | CH₂CH₃ | H | 500 |
| 30 | Br | NO₂ | HNCOCH₃ | CH₂CH₃ | CH₂CH₃ | H | 558 |
| 31 | Br | NO₂ | HNCOCH₃ | CH₂CH₂OCH₃ | CH₂CH₂OCH₃ | H | 550 |
| 32 | NO₂ | NO₂ | HNCOCH₃ | CH₂CH₃ | CH₂CH₃ | H | 573* |
| 33 | Cl | NO₂ | HNCOCH₃ | CH₂CH₃ | CH₂CH₃ | OCH₃ | 594 |
| 34 | Br | NO₂ | HNCOCH₃ | CH₂CH₃ | CH₂CH₃ | OCH₃ | 592 |
| 35 | Cl | NO₂ | HNCOCH₃ | CH₂CH=CH₂ | CH₂CH=CH₂ | OCH₃ | 578 |
| 36 | Br | NO₂ | HNCOCH₃ | CH₂CH=CH₂ | CH₂CH=CH₂ | OCH₃ | 576 |
| 37 | Cl | NO₂ | HNCOCH₃ | CH₂CH₂OCH₃ | CH₂CH₂OCH₃ | OCH₃ | 582 |
| 38 | Cl | NO₂ | HNCOCH₃ | CH₂CH₂OC(O)CH₃ | CH₂CH₂OC(O)CH₃ | OCH₃ | 562 |
| 39 | NO₂ | NO₂ | HNCOCH₃ | CH₂CH₃ | CH₂CH₃ | OCH₃ | 595* |

*= λmax measured in acetone

According to the procedure outlined in Example 1, dyes of formula (Iaa) [Table 2] were prepared (λmax was determined in DMF and is given in nm).

TABLE 2

(Iaa)

| | G¹ | G² | R¹ | R² | R³ | R⁴ | λmax |
|---|---|---|---|---|---|---|---|
| 40 | Br | Br | H | CH₃ | CH₃ | H | 430 |
| 41 | Br | Br | H | CH₂CH₃ | CH₂CH₃ | H | 434 |
| 42 | Br | Br | H | CH₂CH₂CH₂CH₃ | CH₂CH₂CH₂CH₃ | H | 436 |
| 43 | Cl | Cl | H | CH₂CH₃ | CH₂CH₂CN | H | 422 |
| 44 | Br | Br | H | CH₂CH₃ | CH₂CH₂CN | H | 422 |
| 45 | Cl | Cl | H | CH₂CH₂CH₂CH₃ | CH₂CH₂CN | H | 422 |
| 46 | Br | Br | H | CH₂CH₂CH₂CH₃ | CH₂CH₂CN | H | 422 |
| 47 | Cl | Cl | H | CH₂CH₃ | CH₂Ph | H | 432 |
| 48 | Br | Br | H | CH₂CH₃ | CH₂Ph | H | 428 |
| 49 | Cl | Cl | H | CH₂CH₃ | CH₂CH₂CO₂CH₃ | H | 430 |
| 50 | Br | Br | H | CH₂CH₃ | CH₂CH₂CO₂CH₃ | H | 432 |
| 51 | Cl | Cl | H | CH₂CH₃ | CH₂CH₂CO₂C₂H₅ | H | 428 |
| 52 | Br | Br | H | CH₂CH₃ | CH₂CH₂CO₂C₂H₅ | H | 428 |
| 53 | Cl | Cl | H | CH₂CH₃ | CH₂CH₂OC(O)CH₃ | H | 430 |
| 54 | Br | Br | H | CH₂CH₃ | CH₂CH₂OC(O)CH₃ | H | 426 |
| 55 | Br | Br | H | CH₂CH₂CN | CH₂Ph | H | 412 |

TABLE 2-continued (Iaa)

[Structure: A benzoate ester with OCH₂CN group, bearing G¹ and G² substituents, azo-linked to a disubstituted aniline with R¹, R², R³, R⁴ substituents]

| | G¹ | G² | R¹ | R² | R³ | R⁴ | λmax |
|---|---|---|---|---|---|---|---|
| 56 | Br | Br | H | CH₂CH₂CN | CH₂CH₂Ph | H | 422 |
| 57 | Br | Br | H | CH₂CH₂CO₂CH₃ | CH₂CH₂CO₂CH₃ | H | 422 |
| 58 | Br | Br | H | CH₂CH₂OC(O)CH₃ | CH₂CH₂OC(O)CH₃ | H | 420 |
| 59 | NO₂ | Br | H | CH₂CH₃ | CH₂CH₂CO₂CH₃ | H | 506 |
| 60 | NO₂ | Br | H | CH₂CH₂CO₂CH₃ | CH₂CH₂CO₂CH₃ | H | 494 |
| 61 | Cl | Cl | CH₃ | CH₂CH₃ | CH₂CH₂CN | H | 436 |
| 62 | Br | Br | CH₃ | CH₂CH₃ | CH₂CH₂CN | H | 434 |
| 63 | Cl | Cl | CH₃ | CH₂CH₂CH₂CH₃ | CH₂CH₂CN | H | 434 |
| 64 | Cl | Cl | CH₃ | CH₂CH₃ | CH₂Ph | H | 444 |
| 65 | Br | Br | CH₃ | CH₂CH₃ | CH₂Ph | H | 444 |
| 66 | Cl | Cl | CH₃ | CH₂CH₃ | CH₂CH₂CO₂CH₃ | H | 446 |
| 67 | Br | Br | CH₃ | CH₂CH₃ | CH₂CH₂CO₂CH₃ | H | 444 |
| 68 | Cl | Cl | CH₃ | CH₂CH₃ | CH₂CH₂CO₂C₂H₅ | H | 444 |
| 69 | Br | Br | CH₃ | CH₂CH₃ | CH₂CH₂CO₂C₂H₅ | H | 442 |
| 70 | Cl | Cl | CH₃ | CH₂CH₂CH₂CH₃ | CH₂CH₂CO₂C₂H₅ | H | 446 |
| 71 | Br | Br | CH₃ | CH₂CH₂CH₂CH₃ | CH₂CH₂CO₂C₂H₅ | H | 446 |
| 72 | Cl | Cl | CH₃ | CH₂CH₃ | CH₂CH₂CO₂Ph | H | 442 |
| 73 | Br | Br | CH₃ | CH₂CH₃ | CH₂CH₂CO₂Ph | H | 444 |
| 74 | Cl | Cl | CH₃ | CH₂CH₃ | CH₂CH₂CH₂CO₂Ph | H | 452 |
| 75 | Br | Br | CH₃ | CH₂CH₃ | CH₂CH₂CH₂CO₂Ph | H | 450 |
| 76 | Cl | Cl | CH₃ | CH₂CH₃ | CH₂CH₂OC(O)CH₃ | H | 444 |
| 77 | Br | Br | CH₃ | CH₂CH₃ | CH₂CH₂OC(O)CH₃ | H | 444 |
| 78 | Cl | Cl | CH₃ | CH₂CH₃ | CH₂CH₂OC(O)Ph | H | 444 |
| 79 | Br | Br | CH₃ | CH₂CH₃ | CH₂CH₂OC(O)Ph | H | 442 |
| 80 | Cl | Cl | CH₃ | CH₂Ph | CH₂CH₂CN | H | 428 |
| 81 | Br | Br | CH₃ | CH₂Ph | CH₂CH₂CN | H | 428 |
| 82 | Cl | Cl | CH₃ | CH₂Ph | CH₂CH₂OH | H | 444 |
| 83 | Br | Br | CH₃ | CH₂Ph | CH₂CH₂OH | H | 444 |
| 84 | Cl | Cl | CH₃ | CH₂Ph | CH₂CH₂OC(O)CH₃ | H | 434 |
| 85 | Br | Br | CH₃ | CH₂Ph | CH₂CH₂OC(O)CH₃ | H | 432 |
| 86 | Cl | Cl | CH₃ | CH₂Ph | CH₂CH₂OC(O)Ph | H | 432 |
| 87 | Br | Br | CH₃ | CH₂Ph | CH₂CH₂OC(O)Ph | H | 432 |
| 88 | Cl | Cl | CH₃ | CH₂CH₂CO₂CH₃ | CH₂CH₂CO₂CH₃ | H | 434 |
| 89 | Br | Br | CH₃ | CH₂CH₂CO₂CH₃ | CH₂CH₂CO₂CH₃ | H | 436 |
| 90 | Cl | Cl | CH₃ | CH₂CH₂CO₂C₂H₅ | CH₂CH₂CO₂C₂H₅ | H | 436 |
| 91 | Br | Br | CH₃ | CH₂CH₂CO₂C₂H₅ | CH₂CH₂CO₂C₂H₅ | H | 434 |
| 92 | Cl | Cl | CH₃ | CH₂CH₂CN | CH₂CH₂OC(O)CH₃ | H | 428 |
| 93 | NO₂ | NO₂ | CH₃ | CH₂CH₃ | CH₂CH₃ | H | 564* |
| 94 | Cl | Cl | OH | CH₂CH₂CO₂CH₃ | CH₂CH₂CO₂CH₃ | H | 462 |
| 95 | Br | Br | OH | CH₂CH₂CO₂CH₃ | CH₂CH₂CO₂CH₃ | H | 450 |
| 96 | Cl | Cl | HNSO₂CH₃ | CH₂CH₂CO₂CH₃ | CH₂CH₂CO₂CH₃ | H | 444 |
| 97 | Br | Br | HNSO₂CH₃ | CH₂CH₂CO₂CH₃ | CH₂CH₂CO₂CH₃ | H | 444 |
| 98 | H | H | HNCOCH₃ | CH₂CH₃ | CH₂CH₃ | H | 496 |
| 99 | Br | Br | HNCOCH₃ | CH₂CH₃ | CH₂CH₃ | H | 468 |
| 100 | Br | Br | HNCOCH₃ | CH₂CH₂OCH₃ | CH₂CH₂OCH₃ | H | 458 |
| 101 | Cl | Cl | HNCOCH₃ | CH₂CH₂CO₂CH₃ | CH₂CH₂CO₂CH₃ | H | 452 |
| 102 | Br | Br | HNCOCH₃ | CH₂CH₂CO₂CH₃ | CH₂CH₂CO₂CH₃ | H | 454 |
| 103 | NO₂ | H | HNCOCH₃ | CH₂CH₃ | CH₂CH₃ | H | 545* |
| 104 | NO₂ | Br | HNCOCH₃ | CH₂CH₃ | CH₂CH₃ | H | 556 |
| 105 | NO₂ | Br | HNCOCH₃ | CH₂CH=CH₂ | CH₂CH=CH₂ | H | 536 |
| 106 | NO₂ | Br | HNCOCH₃ | CH₂CH₂OCH₃ | CH₂CH₂OCH₃ | H | 534 |
| 107 | NO₂ | Br | HNCOCH₃ | CH₂CH₂OC(O)CH₃ | CH₂CH₂OC(O)CH₃ | H | 490 |
| 108 | NO₂ | NO₂ | HNCOCH₃ | CH₂CH₃ | CH₂CH₃ | H | 569* |
| 109 | Cl | Cl | HNCOCH₃ | H | CH₂CH(OH)CH₃ | Cl | 444 |
| 110 | Br | Br | HNCOCH₃ | H | CH₂CH(OH)CH₃ | Cl | 444 |
| 111 | Br | Br | HNCOCH₃ | CH₂CH₃ | CH₂CH₃ | OCH₃ | 502 |
| 112 | Br | Br | HNCOCH₃ | CH₂CH=CH₂ | CH₂CH=CH₂ | OCH₃ | 486 |
| 113 | Br | Br | HNCOCH₃ | CH₂CH₂OC(O)CH₃ | CH₂CH₂OC(O)CH₃ | OCH₃ | 476 |
| 114 | NO₂ | Cl | HNCOCH₃ | CH₂CH₃ | CH₂CH₃ | OCH₃ | 580 |
| 115 | NO₂ | Br | HNCOCH₃ | CH₂CH₃ | CH₂CH₃ | OCH₃ | 582 |
| 116 | NO₂ | Cl | HNCOCH₃ | CH₂CH=CH₂ | CH₂CH=CH₂ | OCH₃ | 566 |
| 117 | NO₂ | Br | HNCOCH₃ | CH₂CH=CH₂ | CH₂CH=CH₂ | OCH₃ | 566 |
| 118 | NO₂ | Br | HNCOCH₃ | CH₂CH=CH₂ | CH₂CH₂CN | OCH₃ | 556 |
| 119 | NO₂ | Br | HNCOCH₃ | CH₂CH=CH₂ | CH₂CH(OH)CH₂OCH₃ | OCH₃ | 576 |

TABLE 2-continued

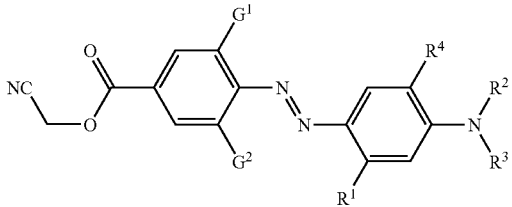

(Iaa)

| | $G^1$ | $G^2$ | $R^1$ | $R^2$ | $R^3$ | $R^4$ | $\lambda$max |
|---|---|---|---|---|---|---|---|
| 120 | $NO_2$ | Br | $HNCOCH_3$ | $CH_2CH_2OCH_3$ | $CH_2CH_2OCH_3$ | $OCH_3$ | 570 |
| 121 | $NO_2$ | Br | $HNCOCH_3$ | $CH_2CH_2OC(O)CH_3$ | $CH_2CH_2OC(O)CH_3$ | $OCH_3$ | 556 |

\* = $\lambda$max measured in acetone

According to the procedure outlined in Example 1, dyes of formula (Ica) [Table 3] were prepared ($\lambda$max was determined in DMF and is given in nm).

TABLE 3

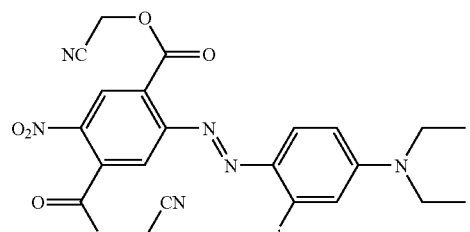

(Ica)

| | $R^1$ | $\lambda$max |
|---|---|---|
| 122 | $HNCOCH_3$ | 572 |
| 123 | $CH_3$ | 568 |

According to the procedure outlined in Example 1, dyes of formula (Iab) [Table 4] were prepared ($\lambda$max was determined in DMF and is given in nm).

TABLE 4

(Iab)

| | $G^1 = G^2$ | $R^8$ | $\lambda$max |
|---|---|---|---|
| 124 | H | $CH_3$ | 422 |
| 125 | Br | $CH_3$ | 410 |
| 126 | Br | $CH_2CH_3$ | 412 |

According to the procedure outlined in Example 1, dyes of formula (Ibc) [Table 5] were prepared ($\lambda$max was determined in DMF and is given in nm).

TABLE 5

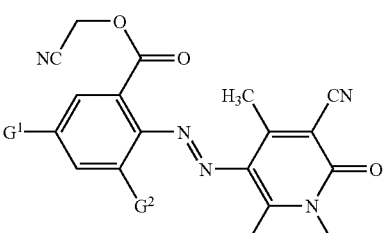

(Ibc)

| | $G^1 = G^2$ | $R^8$ | $\lambda$max |
|---|---|---|---|
| 127 | H | $CH_3$ | 430 |
| 128 | Cl | $CH_3$ | 422 |
| 129 | Br | $CH_3$ | 422 |
| 130 | H | $CH_2CH_3$ | 430 |

According to the procedure outlined in Example 1, dyes of formula (Iac) [Table 6] were prepared ($\lambda$max was determined in DMF and is given in nm).

TABLE 6

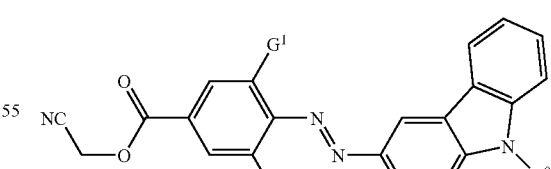

(Iac)

| | $G^1 = G^2$ | $R^9$ | $\lambda$max |
|---|---|---|---|
| 131 | Br | $CH_2CH_3$ | 396 |
| 132 | Br | $CH_2CH_2OH$ | 398 |

According to the procedure outlined in Example 1, dyes of formula (Iad) [Table 7] were prepared ($\lambda$max was determined in DMF and is given in nm).

TABLE 7

(Iad)

![structure Iad]

| G¹ = G² | R¹¹ | λmax |
|---|---|---|
| 133 | Br | CH₃ | 396 |
| 134 | Br | Phenyl | 384 |

According to the procedure outlined in Example 1, dyes of formula (Iae) [Table 8] were prepared (λmax was determined in DMF and is given in nm).

TABLE 8

(Iae)

![structure Iae]

| G¹ | G² | λmax |
|---|---|---|
| 135 | Br | Br | 488 |
| 136 | Br | NO₂ | 552 |

Example 137

According to the procedure outlined in Example 1, the dyestuff of the formula (Ibd).

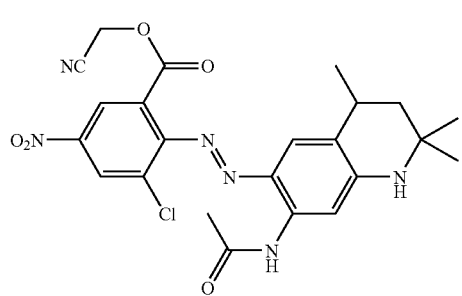

(Ibd)

λmax=566 nm (DMF)

Example 138

4-(2-Acetylamino-4-diallylamino-5-methoxy-phenylazo)-3,5-dicyano-benzoic acid cyanomethyl ester

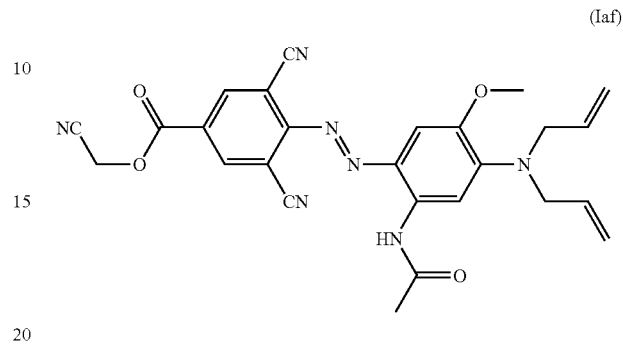

(Iaf)

6.7 parts of the dyestuff of Example 112, 3.2 parts of copper (I) cyanide, 0.3 parts of imidazole, 0.2 parts of sodium iodide and 25 parts of N-methyl-2-pyrrolidinone were charged and heated for 30 minutes at 60-70° C. 70 parts of 2-propanol were added drop wise and the reaction stirred at ambient temperature over night. The precipitate was isolated by filtration and then stirred for 1 hr in 600 parts of an aqueous 6% iron (III) chloride solution. The product was filtered off, washed with 200 parts water and dried to yield 4.8 parts of 4-(2-acetylamino-4-diallylamino-5-methoxy-phenylazo)-3, 5-dicyano-benzoic acid cyanomethyl ester. λmax=614 nm (DMF).

When applied to polyester materials from an aqueous dispersion, blue shades with excellent wet fastness properties were seen.

According to the procedure outlined in Example 138, dyes of formula (Iag) [Table 9] were prepared (λmax was determined in DMF and is given in nm).

TABLE 9

(Iag)

| | Educt | G² | R¹ | R² | R³ | R⁴ | λmax |
|---|---|---|---|---|---|---|---|
| 139 | 41 | CN | H | $CH_2CH_3$ | $CH_2CH_3$ | H | 550 |
| 140 | 44 | CN | H | $CH_2CH_3$ | $CH_2CH_2CN$ | H | 530 |
| 141 | 57 | CN | H | $CH_2CH_2CO_2CH_3$ | $CH_2CH_2CO_2CH_3$ | H | 534 |
| 142 | 58 | CN | H | $CH_2CH_2OC(O)CH_3$ | $CH_2CH_2OC(O)CH_3$ | H | 530 |
| 143 | 95 | CN | OH | $CH_2CH_2CO_2CH_3$ | $CH_2CH_2CO_2CH_3$ | H | 544 |
| 144 | 97 | CN | $HNSO_2CH_3$ | $CH_2CH_2CO_2CH_3$ | $CH_2CH_2CO_2CH_3$ | H | 556 |
| 145 | 99 | CN | $HNCOCH_3$ | $CH_2CH_3$ | $CH_2CH_3$ | H | 594 |
| 146 | 100 | CN | $HNCOCH_3$ | $CH_2CH_2OCH_3$ | $CH_2CH_2OCH_3$ | H | 588 |
| 147 | 102 | CN | $HNCOCH_3$ | $CH_2CH_2CO_2CH_3$ | $CH_2CH_2CO_2CH_3$ | H | 572 |
| 148 | 105 | $NO_2$ | $HNCOCH_3$ | $CH_2CH=CH_2$ | $CH_2CH=CH_2$ | H | 560 |
| 149 | 106 | $NO_2$ | $HNCOCH_3$ | $CH_2CH_2OCH_3$ | $CH_2CH_2OCH_3$ | H | 562 |
| 150 | 104 | $NO_2$ | $HNCOCH_3$ | $CH_2CH_3$ | $CH_2CH_3$ | H | 564 |
| 151 | 111 | CN | $HNCOCH_3$ | $CH_2CH_3$ | $CH_2CH_3$ | $OCH_3$ | 620 |
| 152 | 113 | CN | $HNCOCH_3$ | $CH_2CH_2OC(O)CH_3$ | $CH_2CH_2OC(O)CH_3$ | $OCH_3$ | 614 |
| 153 | 115 | $NO_2$ | $HNCOCH_3$ | $CH_2CH_3$ | $CH_2CH_3$ | $OCH_3$ | 618 |
| 154 | 117 | $NO_2$ | $HNCOCH_3$ | $CH_2CH=CH_2$ | $CH_2CH=CH_2$ | $OCH_3$ | 612 |
| 155 | 120 | $NO_2$ | $HNCOCH_3$ | $CH_2CH_2OCH_3$ | $CH_2CH_2OCH_3$ | $OCH_3$ | 614 |
| 156 | 121 | $NO_2$ | $HNCOCH_3$ | $CH_2CH_2OC(O)CH_3$ | $CH_2CH_2OC(O)CH_3$ | $OCH_3$ | 596 |
| 157 | 119 | $NO_2$ | $HNCOCH_3$ | $CH_2CH=CH_2$ | $CH_2CH(OH)CH_2OCH_3$ | $OCH_3$ | 616 |
| 158 | 118 | $NO_2$ | $HNCOCH_3$ | $CH_2CH=CH_2$ | $CH_2CH_2CN$ | $OCH_3$ | 598 |

According to the procedure outlined in Example 138, dyes of formula (Ibe) [Table 10] were prepared (λmax was determined in DMF and is given in nm).

TABLE 10

(Ibe)

| | Educt | R¹ | R² | R³ | R⁴ | λmax |
|---|---|---|---|---|---|---|
| 159 | 36 | $HNCOCH_3$ | $CH_2CH=CH_2$ | $CH_2CH=CH_2$ | $OCH_3$ | 622 |
| 160 | 34 | $HNCOCH_3$ | $CH_2CH_3$ | $CH_2CH_3$ | $OCH_3$ | 632 |
| 161 | 30 | $HNCOCH_3$ | $CH_2CH_3$ | $CH_2CH_3$ | H | 576 |
| 162 | 31 | $HNCOCH_3$ | $CH_2CH_2OCH_3$ | $CH_2CH_2OCH_3$ | H | 572 |

Example 163

According to the procedure outlined in Example 138, the dyestuff of the formula (Iah) was prepared from the dyestuff of example 135

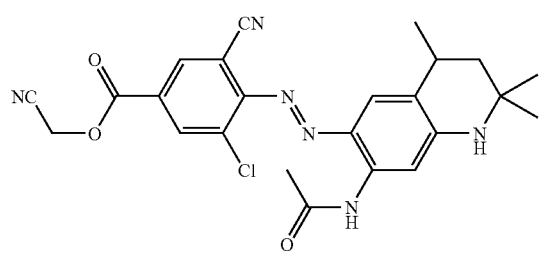
(Iah)

λmax=604 nm (DMF)

The invention claimed is:
1. A dyestuff the formula (Ia)

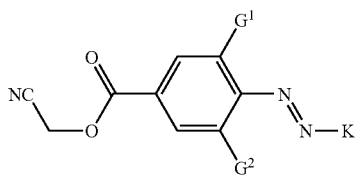
(Ia)

wherein
each of $G^1$ and $G^2$, independently is hydrogen, ($C_1$-$C_4$-alkyl, trifluoromethyl, halogen, nitro, cyano or —$SO_2$—T wherein T is halogen, ($C_1$-$C_4$)-alkyl, ($C_1$-$C_4$)-alkoxy, aryl or aryloxy;
K is a coupling component.

2. A dyestuff of the formula (Ic)

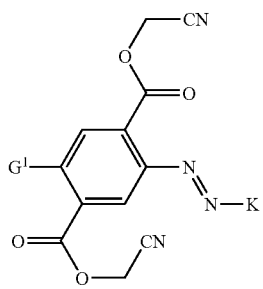
(Ic)

wherein
$G^1$ is hydrogen, ($C_1$-$C_4$)-alkyl, trifluoromethyl halogen, nitro, cyano or —$SO_2$—T, wherein T is halogen, ($C_1$-$C_{10}$-alkyl, ($C_1$-$C_4$)-alkoxy, aryl or aryloxy;
K is a coupling component.

3. A dyestuff of the formula (Iaa)

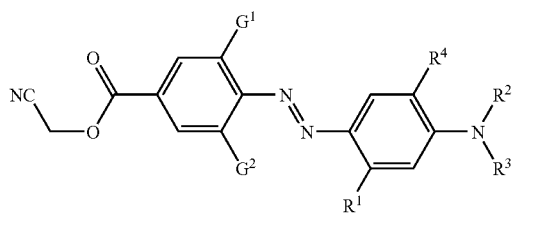
(Iaa)

wherein
each of $G^1$ and $G^2$, independently is hydrogen, chlorine, bromine, nitro or cyano;
$R^1$ is hydrogen, methyl, ethyl, methylsulfonylamino, acetylamino or propionylamino;
each of $R^7$ and $R^3$, independently is hydrogen, methyl, ethyl, propyl or butyl or methyl, ethyl, propyl or butyl which is substituted by hydroxy, cyano, —$COOCH_3$, —$COOC_2H_5$, —COOphenyl, —$OCOCH_3$, —$OCOC_2H_5$, —OCOphenyl, methoxy, ethoxy or phenyl, or is allyl; and
$R^4$ is hydrogen, methyl, ethyl, methoxy, ethoxy or chlorine.

4. A process for the preparation of the dyestuff as claimed in claim 1, which comprises diazotisating an amine of the formula III

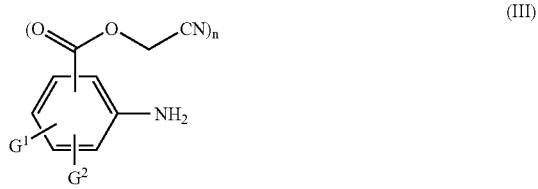
(III)

wherein
each of $G^1$ and $G^2$, independently is hydrogen, ($C_1$-$C_4$)-alkyl, trifluoromethyl, halogen, nitro, cyano or —$SO_2$—T, wherein T is halogen, ($C_1$-$C_4$)-alkyl, ($C_1$-$C_4$-alkoxy, aryl or aryloxy;
n is 1 or 2 and coupling onto a compound of the formula IV

H—K   (IV)

wherein K is a coupling component.

5. A process for dyeing or printing of a synthetic textile material which comprises contacting the material with the dyestuff as claimed in claim 1.

6. Ink for injet printing which contains at least one dyestuff according to claim 1.

7. A process for the preparation of the dyestuff as claimed in claim 2, which comprises diazotising an amine of the formula III

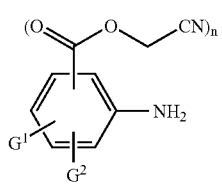

wherein
each of $G^1$ and $G^2$, independently is hydrogen, $(C_1$-$C_4$-alkyl, trifluoromethyl, halogen, nitro, cyano or —$SO_2$—T, wherein T is halogen, $(C_1$-$C_4)$-alkyl, $(C_1$-$C_4)$-alkoxy, aryl or aryloxy;
n is 1 or 2
and coupling onto a compound of the formula IV

H—K          (IV)

wherein K is a coupling component.

8. A process for dyeing or printing of a synthetic textile material which comprises contacting the material with the dyestuff as claimed in claim 2.

9. Ink for injet printing which contains at least one dyestuff according to claim 2.

10. A process for the preparation of the dyestuff as claimed in claim 3, which comprises diazotising an amine of the formula III

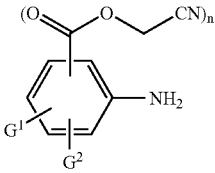

wherein
each of $G^1$ and $G^2$, independently is hydrogen, $(C_1$-$C_4$-alkyl, trifluoromethyl, halogen, nitro, cyano or —$SO_2$—T, wherein T is halogen, $(C_1$-$C_4)$-alkyl, $(C_1$-$C_4)$-alkoxy, aryl or aryloxy;
n is 1 or 2
and coupling onto a compound of the formula IV

H—K          (IV)

wherein K is a coupling component.

11. A process for dyeing or printing of a synthetic textile material which comprises contacting the material with the dyestuff as claimed in claim 3.

12. Ink for injet printing which contains at least one dyestuff according to claim 3.

* * * * *